Jan. 30, 1934.          E. E. METCALF          1,945,119
                         CORN PICKER
                    Filed Oct. 12, 1931       5 Sheets-Sheet 1

WITNESS
WALTER ACKERMAN

INVENTOR
Edgar E. Metcalf
BY Brown, Jackson
Boettcher & Diemer
ATTORNEY

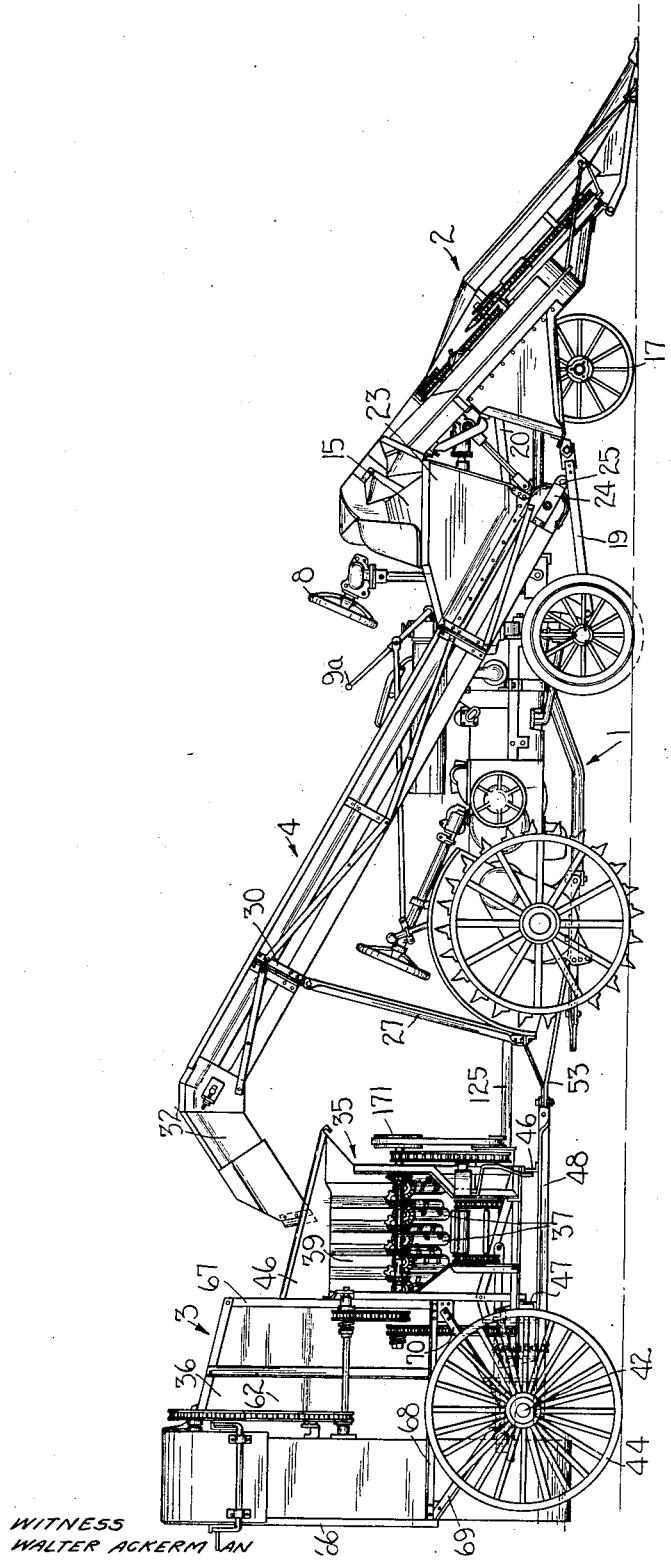

Jan. 30, 1934.  E. E. METCALF  1,945,119
CORN PICKER
Filed Oct. 12, 1931   5 Sheets-Sheet 3
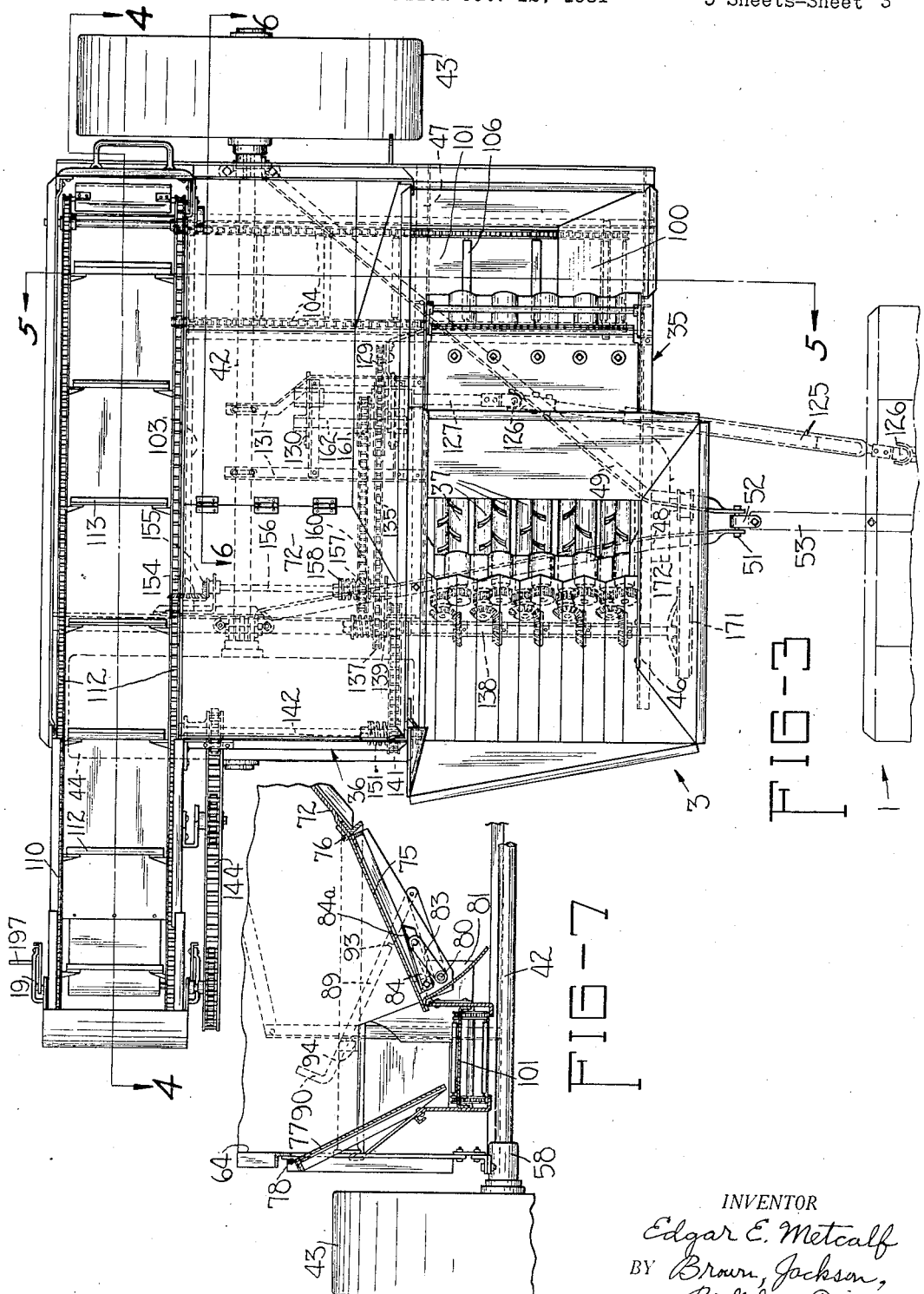
INVENTOR
Edgar E. Metcalf
BY Brown, Jackson,
Boettcher & Dienner
ATTORNEY
WITNESS
WALTER ACKERMAN

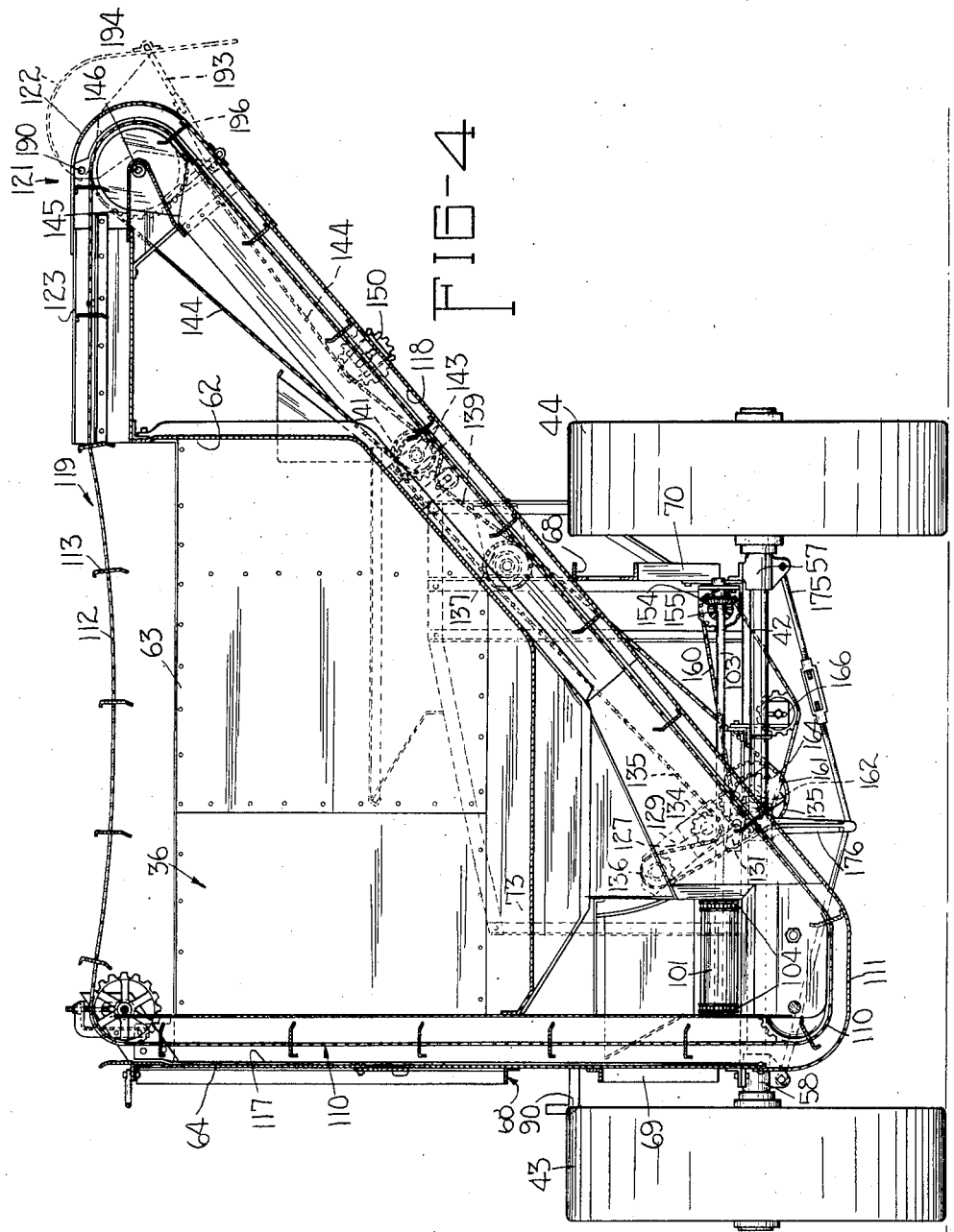

Jan. 30, 1934.  E. E. METCALF  1,945,119
CORN PICKER
Filed Oct. 12, 1931   5 Sheets-Sheet 5
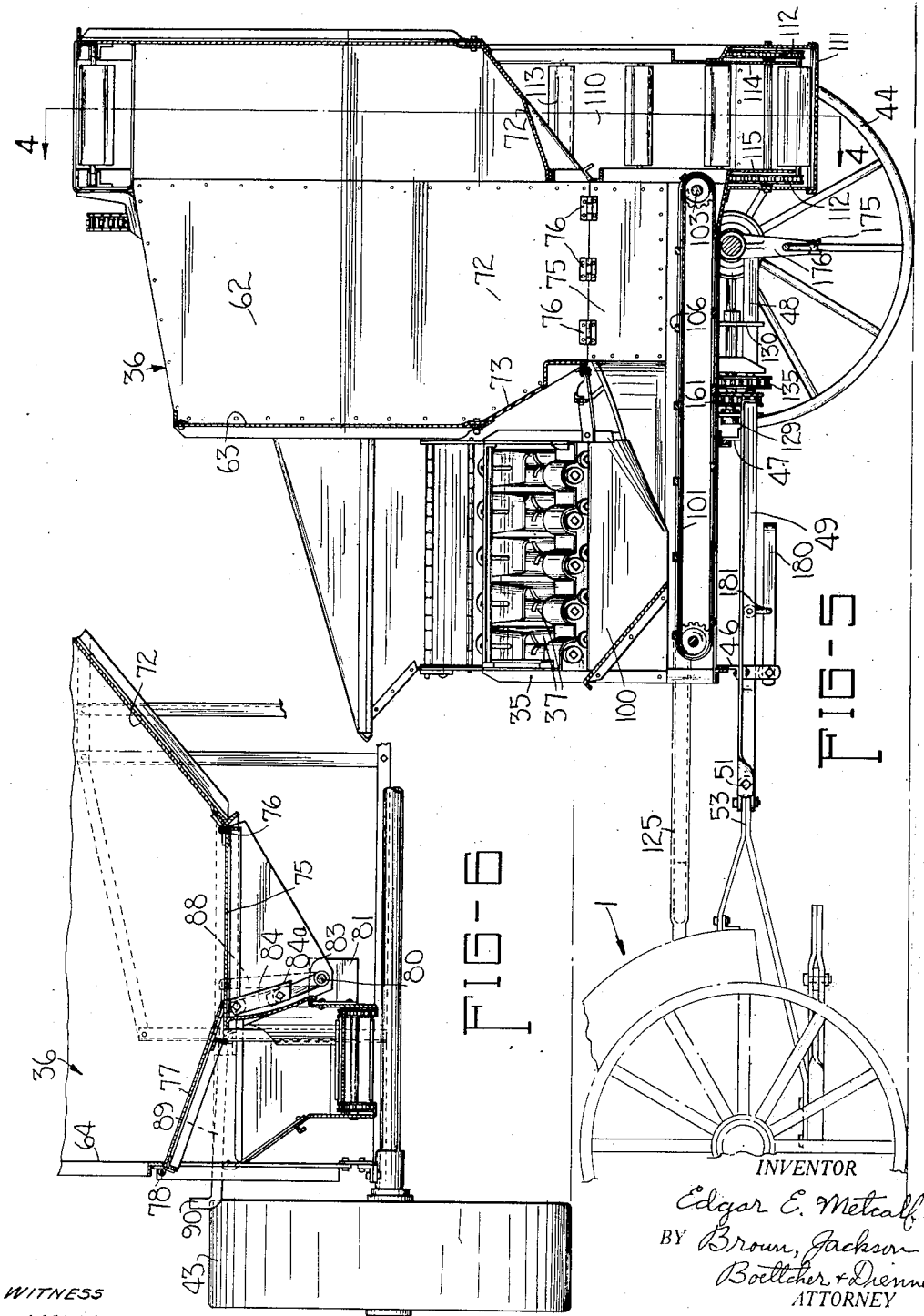
INVENTOR
Edgar E. Metcalf
BY Brown, Jackson
Boettcher & Drenner
ATTORNEY
WITNESS
WALTER ACKERMAN Patented Jan. 30, 1934

1,945,119

UNITED STATES PATENT OFFICE 1,945,119

CORN PICKER

Edgar E. Metcalf, Moville, Iowa, assignor to Deere & Company, Moline, Ill., a corporation of Illinois Application October 12, 1931. Serial No. 568,218

18 Claims. (Cl. 56—18)

The present invention relates generally to agricultural implements and has for its principal purpose the provision of an agricultural implement or machine which comprises a two row picking unit positioned in front of a tractor with a grain tank and husking unit pulled at the rear of the tractor, together with an elevator positioned at one side of the tractor to receive the corn ears from the picking unit and carry them to the grain tank-husking unit at the rear. In such a machine, constructed according to the principles of the present invention, each of the individual implement units are separately supported but are so interrelated that the machine as a whole is easily and conveniently handled and is a complete machine in itself in that the machine in practically one operation removes the ears of corn from the standing stalks in the field, husks the ears, and stores the same until a convenient delivery point is reached, at which time the machine is operative to deliver the harvested corn to trucks or wagons to be hauled away.

As an important feature of the present invention, I also contemplate a new and improved husker and grain tank unit which is so constructed and arranged that as the machine traverses the field the husked ears are delivered to the grain tank and, when the tank is filled or a convenient delivery point is reached, the grain tank-husker unit can be operated to remove the contents accumulated in the tank and discharge said contents away from the tank.

Other objects and advantages of my invention, particularly as regards certain new and useful elements embraced within the machine as an entirety, will be apparent to those skilled in the art after a consideration of the following detailed description of the preferred structural embodiment, taken in conjunction with the accompanying drawings, in which:

Figure 2 is a vertical side elevation of the machine shown in Figure 1;

Figure 3 is an enlarged plan view of the rear grain tank-husker unit;

Figure 4 is a vertical section taken substantially along the line 4—4 of Figure 3 and looking forwardly;

Figure 5 is a longitudinally vertical cross-section, taken substantially along the line 5—5 of Figure 3 and showing particularly the arrangement of the rearwardly moving conveyor which removes the husked ears of corn and delivers them to the elevator which deposits them in the grain tank;

Figure 6 is a fragmentary cross-section taken subs.antially along the line 6—6 of Figure 3 and illustrating particularly the hinged doors forming a portion of the bottom of the grain tank, the doors being in closed position;

Figure 7 is a view corresponding to Figure 6 but showing the dumping bottom when arranged to discharge the contents of the tank.

Figure 1:
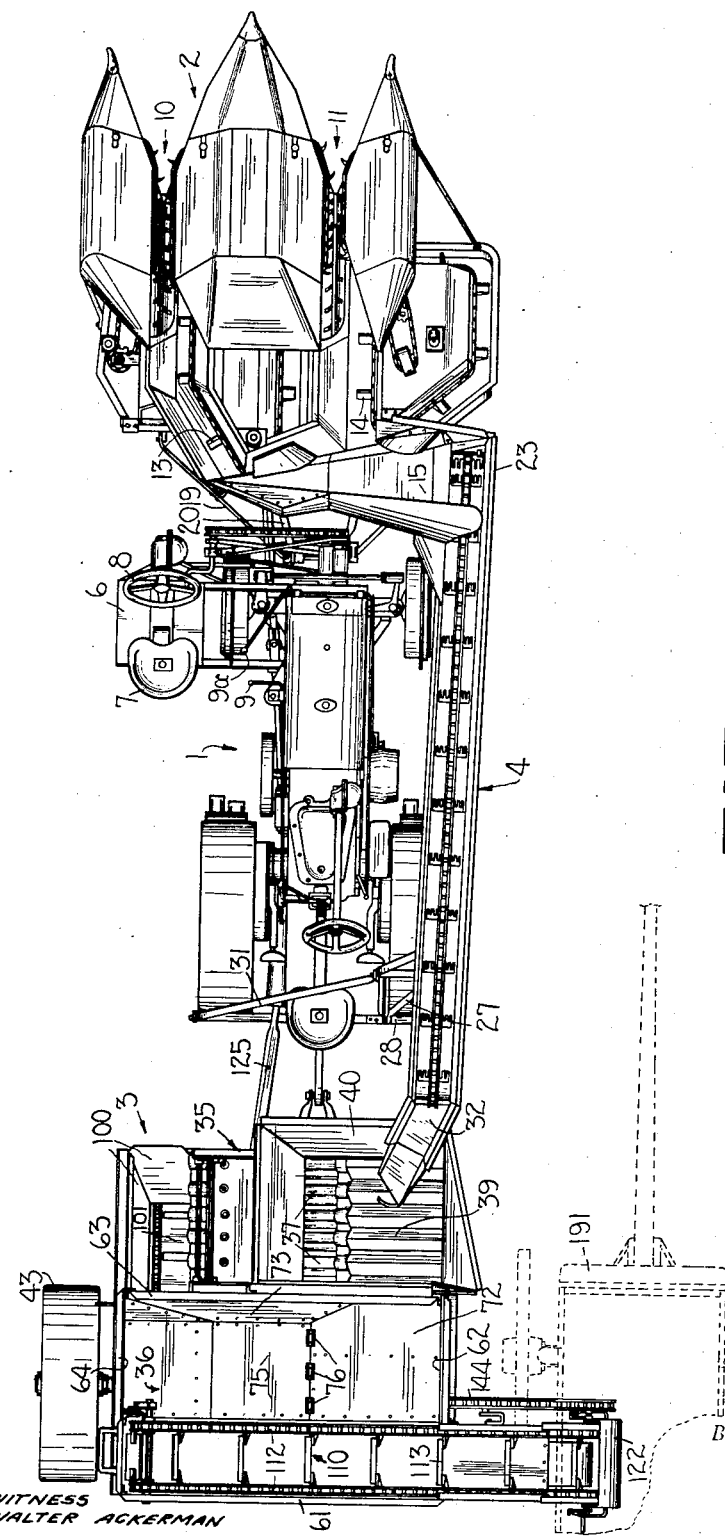
Figure 1 is a top plan view of the entire machine.

Referring now more particularly to Figures 1 and 2, it will be seen that the machine as an entirety comprises a tractor 1, a two-row corn picker 2, a grain tank-husker unit 3, and an elevator or conveyor 4 arranged to receive the corn from the picker 2 and convey the same rearwardly and deliver it to the tank-husker unit 3.

The tractor 1 may be of conventional construction, such as is found on many farms at the present time, and the same is true of the corn picker unit 2. The tractor 1 may be provided, however, with a special platform secured to the front thereof and to one side, the platform 6 being provided with an operator's seat 7 and a steering wheel 8 from which position the operator may control the implement. Controls 9 and 9a lead from the clutch and shifting lever of the tractor to the operator's platform where they are within convenient reach of the operator thereon. Tilting control means for the picker may also be mounted on the platform 6.

The corn picker 2 comprises two pairs of picking rolls 10 and 11 and associated structure by virtue of which the picking unit 2 is in the form of a two-row machine. The corn picker 2 embraces substantially all of the features of the corn picker disclosed in my copending application, Serial No. 529,579, for a Corn harvester, filed April 13, 1931, except that the unit 2 is only a two-row machine instead of a three-row machine. For details of the corn picking unit reference may be had to my copending application, indicated above. It suffices here to note that the corn picker 2 includes the picking rolls 10 and 11, the conveyors 13 and 14 operating to remove the ears of corn from the picking rolls 10 and 11 and to convey the same rearwardly where they are deposited in a hopper 15 forming a part of the picker unit. The picker is supported on a pair of dirigible wheels 17 and is connected with the tractor to be propelled thereby through a pair of parallel links or frame members 19 and 20 in practically the same manner as the implement disclosed in my copending application mentioned above. By virtue of the parallel link frames the forward picker unit is capable of vertical and angular movement in a transverse plane relative to the tractor 1 but is prevented from angular movement with respect to the tractor in a longitudinal vertical plane.

The corn received by the hopper 15 of the picker unit is delivered to the receiving hopper 23 of the elevator 4 and mounted near the forward end thereof. The elevator or conveyor 4 is supported at its front end on the lower parallel link frame 19. For this purpose a forwardly projecting bracket 24 is fixed to the forward end of the elevator 4 and is connected with an eye-bolt 25 fixed to some portion of the lower parallel link frame 19. This connection acts as a universal connection permitting relative movement between the lower frame 19 and the elevator 4.

The rear end of the elevator 4 is mounted upon the upper end of a supporting truss member 27, the latter comprising spaced apart angle bars suitably connected together. The supporting truss 27 is pivotally connected at its lower end with the rear platform bar 28 of the tractor and at its upper end is pivotally connected with one or more of the angle bars 30 secured to the sides of the elevator 4. The truss member 27 is braced by a laterally and downwardly positioned brace bar 32, as best shown in Figure 1. It will thus be seen that one end of the elevator 4 is carried upon the platform while the other end thereof is carried upon the picker unit 2. The head of the elevator 4 is provided with an adjustable chute 32 which delivers the corn to the husker unit.

The grain tank-husker unit 3 comprises a husking box 35 of substantially standard construction built as an integral unit with the grain tank 36. The husking box 35 includes a plurality of husking rolls 37 mounted under the bottom 39 of the receiving hopper 40 of the husker.

The grain tank-husker unit is mounted on a transverse axle 42 supported on a pair of wheels 43 and 44. The frame of the grain tank-husker unit 3 comprises a pair of transverse angle bars 46 and 47 and a pair of forwardly converging longitudinal angle bars 48 and 49 best shown in Figure 3. At their forward ends the frame members 48 and 49 receive a pivot bolt 51 which is connected, through a swivel 52, to the drawbar 53 of the tractor 1. Thus, the forward end of the grain tank unit is supported on the tractor 1 while the rear end thereof is supported by the wheels 43 and 44. The rear ends of the longitudinal frame bars 48 and 49 are directly connected with the axle 42 by means of castings 57 and 58, respectively, as best shown in Figures 3 and 4.

The grain tank 36 comprises vertical side walls 61, 62, 63 and 64 suitably braced and supported by a framework comprising angle bars 66, 67 and 68 at either side of the unit. Other angles 69 and 70 connect the supporting framework to the castings 57 and 58. Additional angles suitably dimensioned connect the various other angles and makes of the supporting framework a rigid structure upon which the grain tank and the husking mechanism can be carried as a single unitary apparatus.

The lower portions of the walls 62 and 63 are inclined inwardly, as at 72 and 73, see Figures 1 and 4. At the lower edge of the sloping portion 72 a door 75 is hinged thereto as by hinges 76. To the wall 64 opposite the sloping portion 72 a second door 77 is hinged as by hinges 78, and this door 77 is adapted to slope downwardly in converging direction with respect to the sloping portion 72, as best shown in Figures 6 and 7. The structure comprising the sloping portions just described provide a dumping bottom having a discharge opening closed by the two hinged doors or gates 75 and 77. Under normal conditions the inner end of the door 77 rests upon the top of the hinged door 75, see Figure 6, whereby the dumping bottom of the grain tank is closed and the grain tank is arranged to receive and retain grain therein.

The position of the two doors or gates 75 and 77 is controlled by manually operated means accessible from the left-hand side of the grain tank-husker unit. A rockshaft 80 is journaled for rocking movement in spaced brackets 81 secured in any manner desired to the framework of the grain tank-husker unit. The rockshaft 80 extends longitudinally of the unit and at one end a link 83 is fixed. The link 83 cooperates with a second link 84 pivoted to the outer end of the link 83 and forming a toggle connection between the rockshaft 80 and the end of the lower door 75, the other end of the second link 84 being pivoted to the door 75, as best shown in Figures 6 and 7. The link 84 may be of any suitable construction but preferably is formed of an angle iron section whereby the flange 84a thereof may be available to cooperate with the link 83 and act as a stop to hold the links 83 and 84 and the door 75 in their closed position as shown in Figure 6. Figure 7 shows these links in their collapsed position with the doors 75 and 77 open, thereby permitting the contents of the tank to be discharged therefrom, as will be explained more in detail later.

The forward end of the rockshaft 80 carries an operating arm 88 to the upper end of which a push bar 89 is connected, this member extending transversely of the unit and having a handle portion 90 at the outer end thereof which may be grasped in the operation of opening and closing the doors 75 and 77. The push bar 89 is provided with a notch 93, see Figure 7, which is arranged to be engaged over an angle iron 94 forming a part of the framework of the unit. When so engaged the push bar 89 is held in the position shown in Figure 6, thereby securely retaining the two hinged doors 75 and 77 in closed position. When it is desired to open the doors all that it is necessary to do is to lift the push bar 89 a sufficient amount to clear the notch 93 from the angle iron 94 and then the bar 89 can be moved inwardly to break the toggle relation between the links 83 and 84. When once broken the doors 75 and 77 swing to their open position under the weight of the material in the tank 36.

In order to convey the husked ears of corn from the husking mechanism into the grain tank the present invention contemplates the provision of a novel system of conveyors and elevators which are adapted, not only to deliver the corn from the husking rolls to the tank, but also to empty the grain tank after it has been filled and discharge the contents thereof into a wagon or truck drawn alongside the machine. This particular feature is an important part of the present invention. Referring now more particularly to Figures 3, 4 and 5, a trough or chute 100 is positioned at the lower ends of the husking rolls and is arranged to direct the husked ears of corn onto a traveling conveyor 101 supported and driven by a shaft 103 and sprocket chains 104. The conveyor 101 includes cross pieces or slots 106 for engaging and moving the ears of corn. The conveyor 101 moves rearwardly substantially underneath the hinged doors 75 and 77, see Figures 6 and 7, and deposits the corn onto a flight elevator 110 at a point where the elevator 110 passes through a boot 111 underneath the grain tank 36, see Figure 5. The flight elevator comprises a pair of chains 112 provided at spaced intervals thereon with flights or paddles 113, and the boot 111 is provided with guide plates 114 and 115 to prevent the corn from becoming entangled between the chains 112 and the sprockets over which the chains are trained.

The flight elevator 110 operates downwardly in a vertical way 117, through the boot 111, then upwardly along an inclined way 118, and finally across the top of the tank, as indicated by the reference numeral 119. The inclined way 118 extends laterally outwardly and upwardly from the boot 111 to a point adjacent the top of the tank 36 where it terminates in spout means 121 comprising a pivoted hood section 122 and a horizontal discharge chute section 123 extending over the top edge of the tank 36 so as to deliver the corn to the open top thereof into the tank as best shown in Figure 4.

After traveling over the husking rolls 37, the husked ears are deposited over the ends of the rolls onto the longitudinally traveling conveyor 101. The ears of corn are carried rearwardly by the conveyor 101 and are discharged at the end thereof into the boot 111. The transverse flight elevator 110 travels at an incline out beyond the outside carrying wheel 44 and moves the ears of corn dropped into the boot 111 along the bottom of the way 118 to a point as high as the top of the tank, through the hood section 122, which under normal conditions is closed as indicated in full lines in Figure 4, and then back horizontally through the chute 123 and into the grain tank 36. The chains 112 carrying the flights or paddles 113 pass across the top and then down the vertical way 117 along the left-hand side of the grain tank 36.

The power for driving the grain tank corn husker unit is obtained through the power take-off shaft 125 of the tractor, see Figure 3. This shaft is provided at both ends with universal joints 126 to provide for flexibility between the tractor and the tank-husker unit 3, and the rear universal joint is connected to a longitudinal shaft 127 which forms the main drive shaft for the husking rolls and for the conveyor and elevator. The main drive shaft 127 is journaled in suitable bearings supported by brackets 129 and 130, which brackets are, in turn, supported upon longitudinal angle bars 131, the rear ends of the latter being fixed as by U-bolts to the rear axle 42 and at their forward ends to the transverse channel member 47.

The main drive shaft 127 carries a drive gear 134 over which is trained a driving chain 135. The driving chain 135 passes over an idler sprocket 136 secured to the bracket 129 as best shown in Figure 4 and then upwardly and over a sprocket 137 connected to the rear end of a husking roll drive shaft 138 through a slip clutch mechanism 139. The husking rolls 37 are driven from the roll driving shaft 138 through bevel and spur gears in the usual manner, as shown in Figure 3.

The transverse flight elevator 110 is driven from the husking roll driving shaft 138. The husking roll driving shaft 138 carries a sprocket just forward of the sprocket 137 and this sprocket drives a chain 139 which, in turn, is trained over a sprocket 141 mounted on a longitudinal shaft 142. The rear end of this shaft carries a sprocket 143 which drives an upper elevator driving chain 144 trained or a large sprocket 145 fixed to the upper elevator shaft 146. This shaft carries suitable sprockets receiving and driving the flight chains 112. The way 118 is preferably provided with a chain tightening sprocket 150 for the purpose of keeping the elevator driving chain 144 tight. A slip clutch connection 151 is preferably provided between the sprocket 141 driven from the husking roll drive shaft 138 and the longitudinal shaft 142 which drives the elevator drive chain 144.

Power is delivered to the longitudinal conveyor 101 through the conveyor drive shaft 103 having a large bevel gear 154 meshing with a bevel pinion 155 carried by a lower longitudinal shaft 156, see Figures 3 and 4. The forward end of this shaft carries a suitable sprocket 157 connected thereto through suitable slip clutch connections 158 and driven by a driving chain 160 which is trained over a sprocket 161 which is fixed to a jack shaft 162, journaled in the brackets 129 and 130. The jack shaft 162 is driven by means of a large sprocket 164 over which the lower bight of the main driving chain 135 is trained, as best shown in Figure 4. A chain tightening idler sprocket 166 adjustably mounted serves to keep the conveyor driving chain tight.

The forwardmost end of the husking roll drive shaft 138 may be provided with a pulley 170 which is belted to and drives a suitable blower mechanism 172. The main supporting axle 42 of the grain tank-husker unit 3 is suitably braced by an adjustable tension rod 175 connected at its ends to the castings 57 and 58 and passing underneath a compression member or strut 176, as best shown in Figure 4. The forward portion of the supporting frame of the unit 3 is provided with a suitable front supporting leg 180 pivoted to the forwardly converging members 48 and 49 and arranged to support the forward ends of the unit when it is detached from the tractor 1. In operation the leg 180 is held up against the frame members 48 and 49 by a suitable latch 181, see Figure 5.

The pivoted hood section of the flight elevator 110 is arranged to be optionally operable to divert the material conveyed upwardly by the elevator structure 110 away from the tank 36 instead of delivering it to the tank. The pivoted hood section 122 is connected with the fixed chute section 123 to swing about an axis 190 from a closed position in which the corn passes over to the chute 123 and into the tank 36 to an open position shown in dotted lines in Figure 4 in which the corn is discharged out through the opening formed by the open hood section and may therefore be deposited in a wagon or truck 191 (see Figure 1) drawn alongside the machine. Toggle mechanism is provided for the purpose of holding the hood section 122 in closed position so that the corn will be delivered over the top of the tank. This toggle mechanism includes a link 193 connected, as at 194, to the lower portion of the swinging hood 122 and a second link 196 connected with the link 193 and mounted for swinging movement on the upper end of one of the side members of the way 118. The link 196 carries an operating arm or crank 197 by which the pivoted hood section 122 may be swung from open to closed position and vice versa at the option of the operator.

The operation of my improved agricultural machine is essentially as follows. The machine is driven down the rows of corn to be harvested. The picker 2 removes the ears of corn from the standing stalks and discharges them into the hopper 23 of the tressed elevator 4 which at its rear end discharges the ears of corn into the husking mechanism 35 of the grain tank-husker unit 3. The husking rolls 37 remove the husks from the ears of corn and deliver the ears to the rearwardly moving conveyor 101. The ears of corn are then received by the elevator 110 and are conveyed upwardly along the inclined way 118 past the closed upper section 122 and into the chute section 123 from which they are dropped into the grain tank 36. The hinged doors of the grain tank are held in closed position as shown in Figure 6 by the toggle links 83 and 84 during this stage of the operation. When the operator has made a complete round of the field or has filled the tank 36, a wagon or truck is driven up beside the tank underneath the outwardly extending end of the conveyor 110 and underneath the pivoted hood 122. By moving the push bar 90 from the position shown in Figure 6 to the position shown in Figure 7, the bottom sections 75 and 77 drop into the position shown in Figure 7 whereupon the contents of the tank are discharged onto the rearwardly moving conveyor 101. It will be observed that in this position the swinging end of the door 75 drops against one edge of the conveyor 101 while the other door 77 drops against the other edge of the conveyor.

The conveyor 101 now empties the grain tank 36 by removing the ears of corn from underneath the opening provided by the open doors 75 and 77 and discharging the ears into the boot 111 from which the ears are removed by the upwardly moving flights 113 on the elevator 110. The pivoted hood section 122 is now opened by swinging the handle 197 to bring the hood to its dotted line position shown in Figure 4, whereupon the ears of corn moved upwardly by the upwardly moving flights 113 drop out of the elevator and into the wagon or truck. After the grain tank 36 has been emptied in this manner the machine is ready for operation again after closing the hood 122 and the doors 75 and 77.

It is to be understood that various changes can be made in the disclosed machine without departing from the spirit of the present invention. While I have disclosed a corn picker as the first unit and a corn husking mechanism as a part of the grain tank unit it is to be understood that other operating implements may be substituted and that, therefore, the corn picker unit 2 represents any form of harvester which operates upon standing crops in the field. It is also to be understood that under certain conditions, a wagon or truck may be propelled alongside the machine at all times in which the swinging doors 75 and 77 and the hood section 122 would be so arranged that the harvested crop would be deposited into the wagon or truck directly without passing into or being stored temporarily in the grain tank. This method of operation might be necessary where the fields are rough or soft or the going was heavy for any other reason so that the additional load imposed upon the machine by virtue of the weight of the material in the tank would be objectionable.

What I claim is:

1. An agricultural machine comprising, in combination, a tractor having a power take-off, a corn picker including snapping mechanism propelled by the tractor and mounted forwardly thereof, a grain tank connected to the rear of the tractor and propelled thereby, said grain tank including a corn receiving hopper, and conveyor means associated with the grain tank and arranged to optionally discharge corn received from the corn picker into the hopper or to discharge corn from the hopper.

2. An agricultural machine comprising, in combination, a tractor having a power take-off, a grain harvesting implement connected with the forward end of the tractor and adapted to be propelled thereby, a grain tank having supporting wheels and connected with the rear of the tractor, and conveying mechanism operated from the power take-off from the tractor and arranged to deliver grain from the harvesting implement to the grain tank.

3. An agricultural machine comprising, in combination, a motor driven tractor, a corn picking unit mounted forwardly of the tractor and movable with respect thereto, means driving the picking unit from the motor of the tractor, a corn husking unit including husking mechanism and a grain tank and separate supporting wheels therefor, said unit being connected with the tractor at the rear thereof to be pulled thereby, and elevator means for conveying the ears of corn from the picking unit to the husking unit, said last named means being driven from the motor of the tractor.

4. In combination, a tractor having a power take-off, a harvester unit, separate supporting wheels for said unit, means connecting the harvester unit with the tractor for movement relative thereto, whereby the harvester unit is adapted to be propelled by the tractor, the harvester mechanism being driven from the power take-off of the tractor, a conveyor arranged to receive grain from the harvester unit and to convey the same rearwardly, means supporting the forward end of the conveyor on said unit, and means supporting the rear end of said conveyor on the tractor.

5. An agricultural means comprising, in combination, a tractor having a power take-off, a picking unit separately supported forwardly of the tractor and connected therewith, picking mechanism carried by said unit and adapted to be driven from said power take-off, a separately supported grain tank unit connected to the tractor at the rear thereof, conveyor means including an elevator having one end carried by the picking unit and the other end carried by the tractor and adapted to convey grain from the picking unit to the grain tank unit, and conveyor means associated with the grain tank and driven from the power take-off of the tractor, said last named conveyor means being adapted to discharge grain from the grain tank unit.

6. An agricultural machine comprising, in combination, a tractor, a corn husking unit at the rear of the tractor including a plurality of husking rolls, a harvesting unit connected with the tractor so as to be movable vertically with respect thereto and with respect to said husking unit, a grain tank adapted to retain accumulated quantities of husked corn, an elevator mechanism arranged to deliver husked corn to said tank, conveyor mechanism adapted to receive the husked corn from the husking rolls and deliver the same to said elevator mechanism, and conveyor mechanism adapted to receive corn from the grain tank and to deliver the corn to a point spaced therefrom.

7. An agricultural implement comprising a wheel supported frame, a husking unit including a plurality of transversely extending inclined husking rolls, and a hopper cooperating therewith, said husking unit being mounted on the forward portion of said supporting frame, a grain storage tank supported on said frame in rear of the husking unit, an elevator extending from the lower part of the tank to the upper part thereof, and a longitudinally operating conveyor adapted to receive the husked corn from the lower ends of the husking rolls and discharge the same onto said elevator.

8. An agricultural implement comprising a wheel supported frame including transverse members and forwardly converging longitudinal members, a husking unit mounted on the forward part of the frame and including a receiving hopper and a plurality of husking rolls, means carried by the frame and in operative driving engagement with said rolls, a grain tank positioned on said frame adjacent to said husking unit and comprising a container having sloping bottom walls and an opening therein and a hinged door controlling said opening, a traveling conveyor arranged to receive husked corn from said husking rolls and arranged to pass underneath said opening, an elevator arranged to receive husked corn from said conveyor and to deliver the corn to said tank, said door being adapted when opened to rest on the side of said conveyor so as to discharge the contents of the tank onto the conveyor, said conveyor then operating to deliver the contents of the tank to said elevator, spout means associated with the upper end of the elevator and arranged to discharge the material conveyed before it reaches the tank, and toggle mechanism for controlling the position of said hinged door.

9. An agricultural machine comprising a wheel supported frame, a husking unit secured to the frame near the forward end thereof and including a hopper and a plurality of husking rolls arranged transversely of the frame, a grain tank mounted on the frame and positioned in rear of the husking unit, a traveling conveyor arranged longitudinally of the frame and near one side thereof, said conveyor being adapted to receive the discharge from said husking rolls and to move the same rearwardly, an elevator extending transversely of said wheel supported frame near the rear portion of the grain tank and arranged to receive material from said conveyor, and spout means associated with said elevator for optionally diverting the material received from the conveyor either into said tank or to a point of discharge spaced therefrom.

10. In combination, a corn harvesting machine including a plurality of husking rolls, a grain tank, and an elevator circumscribing said tank and having a lower grain receiving run near the lower part of the tank and an upwardly extending grain conveying run, said conveyor being adapted to receive grain at its lower run from said husking rolls and deliver the same to said tank.

11. In combination, a plurality of husking rolls, a grain tank having an upper open end, a grain elevator circumscribing the tank and including a lower run below the tank and an upper run passing over the tank, the lower run being adapted to receive grain from said rolls and the upper run being adapted to discharge the same into the open end of said tank.

12. In combination, a corn husking unit including a plurality of husking rolls, a grain tank, a flight elevator circumscribing the tank in a vertical plane and including a lower run and an upper run, means for conveying grain from said rolls to the lower run of said elevator, and spout means associated with the upper run of the elevator and adapted to be optionally arranged to discharge grain into the tank or to one side thereof.

13. An agricultural machine comprising, in combination, a tractor having a power take-off, a corn picker driven from said power take-off and mounted forwardly of the tractor, a husking unit having separate supporting means and connected to rear of the tractor to be propelled thereby, and elevator means supported by the tractor and arranged to receive the corn after it has been picked and discharge the same into said separately supported husking unit.

14. An agricultural implement comprising, in combination, a tractor having a power take-off, a corn picker including snapping mechanism propelled by the tractor and mounted forwardly thereof, a husking box unit disposed rearwardly of the tractor and including a pair of supporting wheels and husking mechanism, means connecting said mechanism with the power take-off of the tractor, draft means connecting said husking box unit with the tractor, and elevator means also driven from the power take-off of the tractor and adapted to receive grain from said husking mechanism.

15. An agricultural implement comprising, in combination, a tractor having a power take-off, a corn picker including snapping mechanism propelled by the tractor and mounted forwardly thereof, a husking box unit disposed rearwardly of the tractor and including husking mechanism and a pair of supporting wheels therefor, draft means connecting the forward portion of said husking box unit with the rear of the tractor, means connecting the husking mechanism with the power take-off of the tractor, means for conveying ears of corn from said snapping mechanism to said husking mechanism, and elevator means receiving ears of corn from the husking mechanism and adapted to deliver the ears to a point of discharge.

16. An agricultural implement comprising, in combination, a motor driven tractor, a corn picking unit mounted forwardly of the tractor and propelled thereby, means driving the picking unit from the motor of the tractor, a corn husking unit connected with the tractor at the rear thereof to be pulled thereby and including husking mechanism also driven from the motor of the tractor, a pair of supporting wheels for the husking unit carrying a portion of the weight of said unit, the remainder of the weight of said unit being imposed upon the rear of the tractor, conveyor means for conveying ears of corn from the picking unit to the husking unit, and elevator means carried by said husking unit and adapted to receive the ears of corn therefrom.

17. An agricultural implement comprising, in combination, a tractor, a corn picker having separate supporting wheels and disposed in front of the tractor so as to be propelled thereby, said corn picker being connected with the tractor so as to be capable of rising and falling movement with respect thereto, a husking unit having separate supporting wheel means adapted to carry at least a portion of the weight thereof, said husking unit being arranged to receive corn from said picker, and a grain tank drawn by the tractor at the rear thereof and arranged to receive corn from said husking unit.

18. An agricultural machine, comprising, in combination, a tractor having a power take-off, a corn picker separately supported forward of the tractor and connected therewith so as to be capable of vertical movement relatively thereto, said corn picker including snapping mechanism driven from the power take-off of the tractor, a husking unit supported at one end on the tractor and at the other end by ground engaging means, and means driven from the power take-off of the tractor for delivering corn from the picker to the husking unit.

EDGAR E. METCALF.